Feb. 12, 1957 E. STUMP 2,780,943
MOTION-TRANSMITTING DEVICE, PARTICULARLY FOR THE
STEERING MECHANISM OF MOTOR VEHICLES
Filed Sept. 21, 1951 2 Sheets-Sheet 1
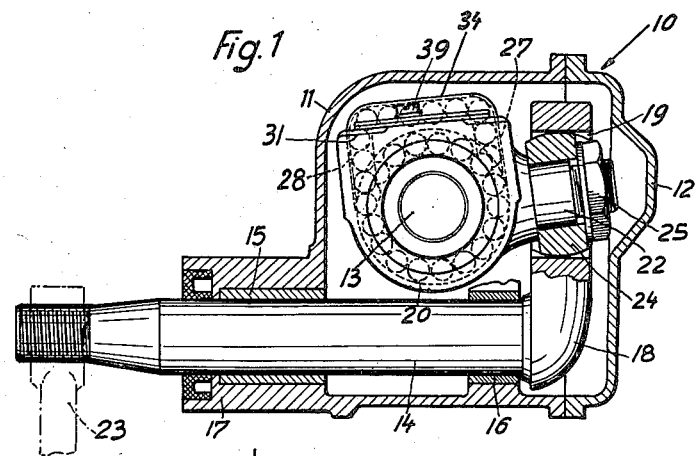
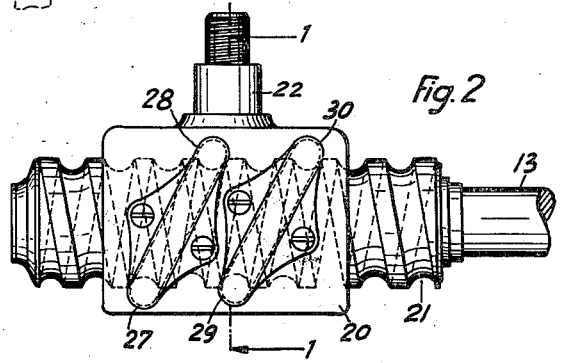
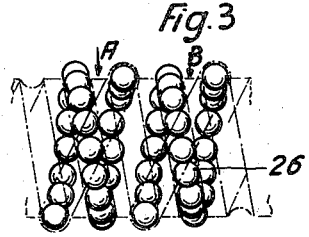
Inventor
Eugen Stump
By Austin, Liche, Wilhelm + Pedlar
Attorneys

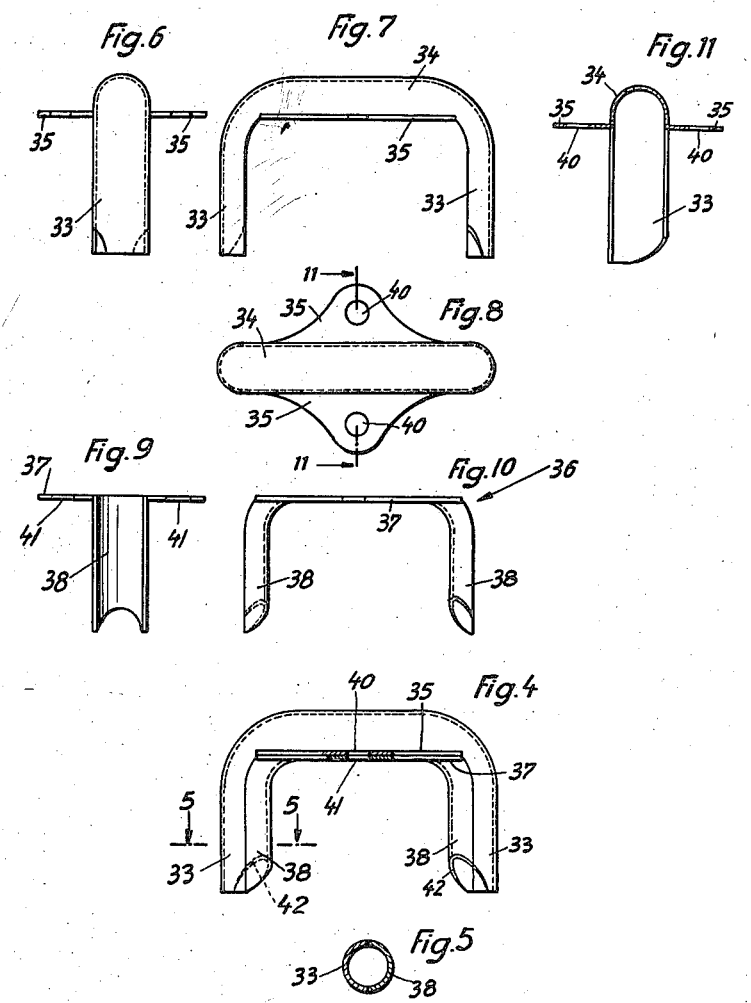

United States Patent Office 2,780,943
Patented Feb. 12, 1957

2,780,943

MOTION-TRANSMITTING DEVICE, PARTICULARLY FOR THE STEERING MECHANISM OF MOTOR VEHICLES

Eugen Stump, Stuttgart-Unterturkheim, Germany, assignor to Daimler-Benz Aktiengesellschaft, Stuttgart-Unterturkheim, Germany Application September 21, 1951, Serial No. 247,628

Claims priority, application Germany September 27, 1950

5 Claims. (Cl. 74—459)

My invention relates to a motion-transmitting device, particularly for the steering mechanism of motor vehicles, in which motion is to be transmitted from the shaft of the steering wheel to a shaft spaced therefrom and extending transversely thereof and having an arm linked to the steering linkage.

More specifically, my invention relates to a motion-transmitting device of the kind comprising a threaded spindle, a nut thereon, a shaft spaced from and extending transversely of said spindle, an arm on said shaft, and means connecting said nut and said arm, whereby a travel of the nut caused by rotation of the spindle will rock the arm and the shaft.

It is an object of the present invention to provide a motion-transmitting device of that type involving a minimum of friction and being safe from any jamming effect, even on transmission of extraordinary forces. It is another object of the present invention to provide a motion-transmitting device of the type stated hereinabove which excels by its simplicity and compactness; to provide a motion-transmitting device in which anti-friction balls are inserted between the threaded spindle and the nut thereon, the number of said balls being reduced to a minimum; and to provide improved means for conducting the balls on their return from one point of the nut to another point of the nut, such means being so shaped as to guide the balls safely and yet with a minimum of clearance and jamming.

Further objects of my invention will appear from the description of a preferred embodiment of my invention, and the features of novelty will be pointed out in the claims.

In the drawings,

Fig. 1 is an elevation of the novel motion-transmitting device partly shown in section along the line 1—1 of Fig. 2;

Fig. 2 is a plan view of the spindle and the nut shown in Fig. 1;

Fig. 3 is a ghost view of the anti-friction balls interposed between the spindle and the nut illustrated in Figs. 1 and 2;

Fig. 4 is an elevation of one of the two return conduits for the balls shown in Fig. 2, Fig. 4 being on a larger scale than Fig. 2;

Fig. 5 is the section taken along the line 5—5 of Fig. 4;

Fig. 6 is a side view of the outer one of the two complementary sheet metal shells forming the conduit illustrated in Fig. 4;

Fig. 7 is an elevation of the shell shown in Fig. 6;

Fig. 8 is the plan view of Fig. 7;

Fig. 9 is a side view of the inner one of the two sheet metal shells;

Fig. 10 is the elevation of Fig. 9; and

Fig. 11 is the section taken along the line 11—11 of Fig. 8.

Through a casing designated by 10 as a whole and formed by a section 11 and a section 12 suitably connected thereto by screws not shown, a shaft 13 extends, which may be the shaft of a steering wheel of a motor vehicle, being journalled in the walls of such casing by suitable anti-friction thrust bearings not shown.

A shaft 14 journalled in suitable bearings 15 and 16 in a boss 17 of housing section 11 extends transversely of spindle 13 at a distance therefrom and has an arm 18 provided with a cylindrical opening 19. A section of shaft 13 located within housing 11 is formed as a threaded spindle being provided with a helical groove 21 of substantially semi-circular profile. The threaded spindle co-operates with a nut 20 provided with a lateral arm 22. A ball joint is provided between the arms 22 and 18 whereby the nut 20, when caused by rotation of spindle 13 to travel along the same, will rock both arm 18 and shaft 14. An arm 23 attached to shaft 14 is connected to the steering linkage of the vehicle in any suitable manner. Hence, it will appear that rotation of shaft 13 of the steering wheel in one direction or the other will be transmitted to shaft 14 and thus to the steering linkage.

The ball joint is formed by a cylindrical opening in one of the two arms 18 and 22 and by a ball provided on the other one of the two arms and disposed within said opening. In the present embodiment, the opening is provided in the arm 18 and designated by 19, while the ball is provided on arm 22 being formed by an annular member 24 seated on a reduced stud forming arm 22 and held in place by a nut 25, the annular member 24 having a spherical circumference.

In the position shown the arm 18 extends at right angles to the spindle 13. In this position the center of the ball joint is spaced from the axis of shaft 14 a distance slightly larger than that of the axis of spindle 13. When the arm 18 is rocked so as to be brought to an oblique position with respect to the spindle 13, however, the center of the ball joint will be lowered with respect to the position shown in Fig. 1. As a result, the nut will be slightly rocked about the axis of spindle 13, such rocking motion causing the spherical face of member 24 to move a slight distance outwardly or inwardly within opening 19.

In order to reduce the friction between the spindle 13 and the nut 20, anti-friction balls 26 are inserted therebetween. For this purpose, the sleeve constituting the nut 20 is provided with an internal helical groove preferably having a semi-circular profile similar to that of groove 21 and registering with the latter. In the registering grooves of the spindle 13 and of the nut 20 rows of balls are inserted, as indicated in Fig. 3, such balls keeping the internal face of the nut 20 slightly spaced from the periphery of the grooved section of shaft 13.

As upon rotation of spindle 13 the anti-friction balls will travel in the internal groove of nut 20, provisions must be made for the reception of the balls near one end of the nut and for the return of the balls to a point spaced from that end. For this purpose, at least one return conduit must be co-ordinated with the nut and must be so shaped and arranged as to receive the balls issuing at one point of the nut returning the same to another point thereof. For this purpose, in the present embodiment of my invention, the nut is provided with substantially parallel transverse bores 27, 28, 29 and 30 which extend from the upper substantially flat face 31 of the nut tangentially to the internal threads thereof. In each pair 27, 28, and 29, 30, respectively, of such bores suitable ball-conducting means are inserted. In the present embodiment, such ball-conducting means are formed by two complementary sheet metal shells 32 and 36, one being shown in Figs. 6, 7 and 8, and the other one being shown in Figs. 9 and 10. Such shells are so shaped as to provide a U-shaped channel between them.

More particularly, there is an outer shell designated by 32 as a whole which is formed by two parallel arms 33 of semi-circular cross sectional profile connected by a central section 34 having a cross sectional channel profile and being provided with lateral flanges 35 on either side. The U-shaped sheet metal shell 36 is composed of a flat central section 37 formed with two depending arms 38 having concave outer faces. The two sheet metal shells 32 and 36 are mounted in nested relationship, as shown in Figs. 4 and 5, in which they provide a U-shaped channel between them. The end sections of this channel formed by the arms 33 and 38 are of substantially circular cross section and extend into the bores 27, 28, or 29, 30 respectively, as will appear from Figs. 1 and 2, so as to extend into the grooves 21 for the purpose of scooping the balls 26 out of the groove 21 at one end of the conduit and conducting the balls through the conduit diagonally across the upper face 31 of the nut and then inwardly back to the groove 21. When the two sheet metal shells are thus mounted on the nut 20, the flange 35 and the flat central section 37 are imposed upon one another and on the flat upper face of the nut 20 and attached to the latter by screws 39 which pass through registering holes 40 and 41 provided in the flanges 35 and the section 37.

It will be noted that the inner ends of the conduit formed by the sheet metal shells are beveled, as shown at 42, in order to be able to extend into the groove 21 without, however, bearing upon the surface of the spindle 13.

Preferably, the four bores 27, 28, 29 and 30 are so disposed that approximately one and a half windings of the thread 21 extend between the first bore 27 and the second bore 28, and about one half of a winding extends between the second bore 28 and the third bore 30, and about one and a half windings of the thread extend between the third bore 29 and the fourth bore 30. In this manner, two independent endless rows of balls indicated in Fig. 3 at A and at B are provided which will safely support the sleeve constituting nut 20 near its ends and will thereby effectively preclude any jamming effect that otherwise might be exerted upon the nut by the forces exerted upon the arm 22 thereof.

From the foregoing description it will become apparent that the motion-transmitting device meets the requirements of a steering gear in an ideal manner. The interposition of the two endless rows of anti-friction balls 26 keeping the inner face of nut 20 slightly spaced from the spindle 13 and the interposition between the arms 22 and 18 of the freely rotatable ring 24 ensures easy operation requiring a minimum of physical effort from the driver of the motor vehicle. The great number of balls 26 and the rugged structure of the arms 18 and 22 and of the ball joint therebetween permit powerful torques to be transmitted from spindle 13 to shaft 14 without unduly stressing the material and without causing any material wear. Irrespective of the interposition of the anti-friction means 24 and 26 between the nut 20 and both the spindle 13 and the shaft 14 securing easy operation of the steering mechanism, any shocks acting on the wheels travelling on the road and transferred via the steering linkage to shaft 14, arm 18 and nut 20 will tend to displace the same lengthwise of spindle 13 and will be taken up by the thrust bearings of spindle 13 without being transferred to the steering wheel.

Moreover, it will be apparent that the motion-transmitting device is extremely simple and compact requiring a minimum number of balls 26 because of the disposition of the latter in two axially spaced rows. Preferably, both rows A and B of anti-friction balls 26 are disposed in the same helical groove 21 of spindle 13 whereby the manufacture is simplified.

The composition of the ball-returning conduit of the two complementary sheet metal shells 32 and 36 has the advantage that the ball-guiding conduit may be more accurately shaped so as to secure a guidance which is free from jamming while guaranteeing a minimum of lateral clearance of the balls. Such lateral clearance is undesirable, since it would have a tendency of producing a jamming effect between successive balls.

Having now described my invention with reference to a preferred embodiment thereof, I wish it to be clearly understood that my invention is capable of numerous modifications within the scope of the appended claims.

What I claim is:

1. In a motion-transmitting device, the combination comprising a threaded spindle, a nut thereon, anti-friction balls interposed therebetween, and a return conduit coordinated with said nut and shaped to receive the balls issuing at one point of the nut and returning the same to another point of said nut, said conduit being formed by two complementary sheet metal shells providing a U-shaped channel, the ends of said channel extending tangentially to and forming continuations of the internal threads of said nut, said U-shaped channel effectively forming two arm-like end sections and one intermediate section therebetween with the axes thereof extending in different directions, the planes of the separating joints of said two sheet metal shells of each such section being parallel to corresponding axes thereof and substantially perpendicular to a plane including the axes of one of said end sections and said intermediate section.

2. The combination according to claim 1 in which the complementary sheet metal shells are formed with flanges with perforations therein, said flanges overlying each other when the shells are assembled with the perforations in alignment to receive fastening means connecting the shells to each other and to the nut.

3. In a motion-transmitting device, the combination comprising a threaded spindle, a nut thereon, anti-friction balls interposed therebetween, a return conduit coordinated to said nut and adapted to receive the balls issuing at one point of the nut returning the same to another point of said nut, said conduit being formed by substantially parallel transverse bores of said nut extending tangentially to the internal threads thereof and by two complementary U-shaped flanged sheet metal shells mounted in nested relation in which they provide a U-shaped channel between them, the ends of said nested sheet metal shells extending into said bores, the central section of the outer one of said shells having a channel-shaped cross section, and the central section of the inner one of said shells being flat for fitting with the flat portion of the nut constituting a cover closing said channel in the outer shell.

4. In a motion-transmitting device, the combination claimed in claim 3 in which the arms of said U-shaped flanged sheet metal shells have a semi-circular cross section.

5. In a transmission device for converting a rotary into an axial motion by means of a ball chain running in a thread, a return line for the balls comprising a U-shaped channel-like guide part having a central part of U-shaped concave cross-section with outwardly directed end flanges, the height of the U-shaped cross-section being substantially equal to the width of this cross-section and having end parts of semi-circular cross-section, the U-shaped channel being open towards the inside, and a further guide part consisting of a flat roof-shaped central part adapted to close the central open side of the first mentioned guide part and channel-shaped end parts with outwardly open U-shaped cross-section adapted to supplement the end parts of the first mentioned guide part complementing them so as to form a full pipe section.

References Cited in the file of this patent

UNITED STATES PATENTS

| | | |
|---|---|---|
| 2,019,927 | Porsche | Nov. 5, 1935 |
| 2,159,225 | Phelps et al. | May 23, 1939 |
| 2,214,492 | Trbojevich | Sept. 10, 1940 |
| 2,267,524 | Hawkins | Dec. 23, 1941 |
| 2,380,662 | Means | July 31, 1945 |
| 2,444,886 | Vickers | July 6, 1948 |

FOREIGN PATENTS

| | | |
|---|---|---|
| 627,365 | Great Britain | Aug. 8, 1949 |